Jan. 28, 1964  J. H. CRUISE ETAL  3,119,440
METHOD OF PRE-MIXING CO GAS AND AIR IN
A CO FIRED STEAM GENERATOR
Filed April 5, 1961
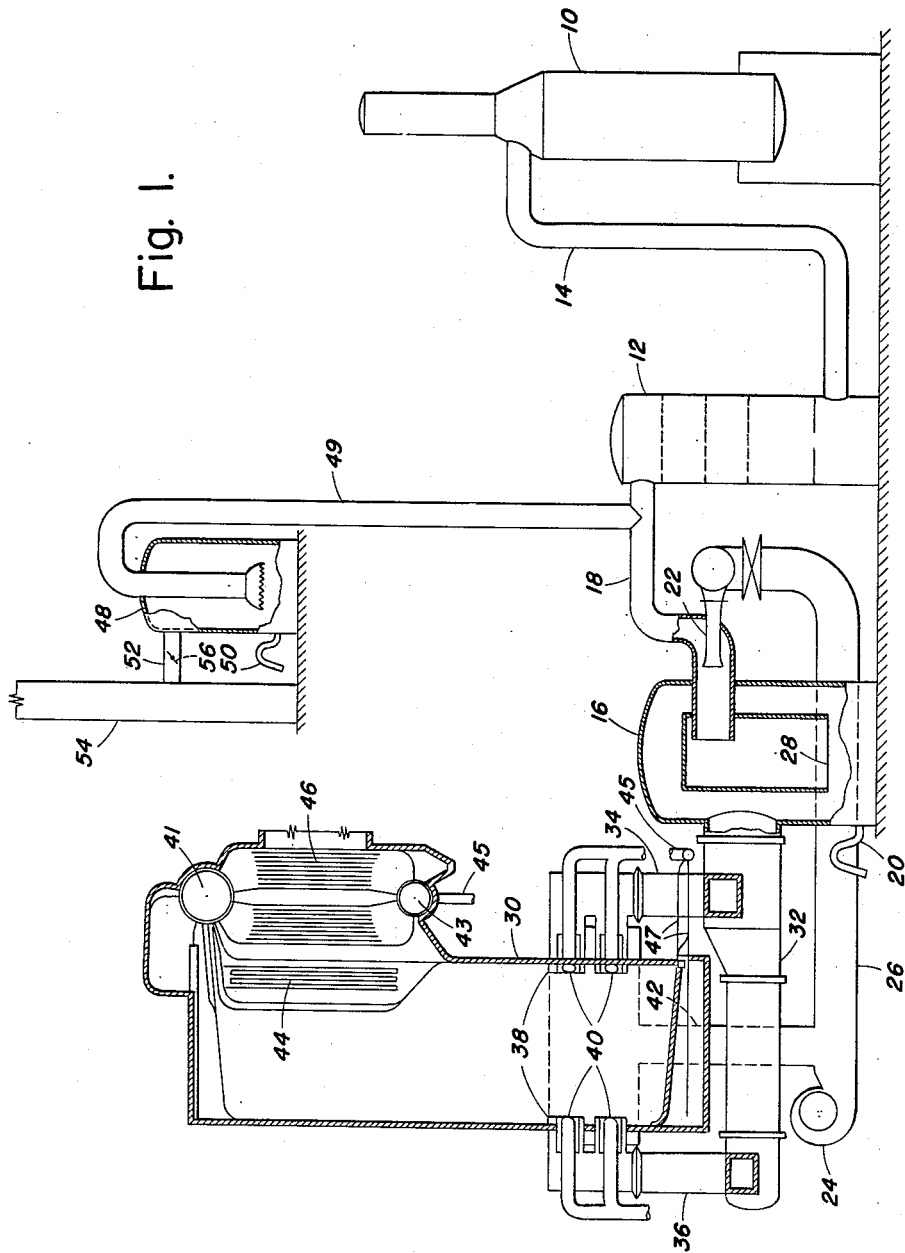
Fig. I.
INVENTORS
John H. Cruise
Henry Schroeder
BY
C. F. Bryant
ATTORNEY United States Patent Office 3,119,440
Patented Jan. 28, 1964

3,119,440
METHOD OF PRE-MIXING CO GAS AND AIR IN A CO FIRED STEAM GENERATOR
John H. Cruise, New York, N.Y., and Henry Schroeder, Hartford, Conn., assignors to Combustion Engineering, Inc., Windsor, Conn., a corporation of Delaware
Filed Apr. 5, 1961, Ser. No. 100,975
1 Claim. (Cl. 158—117.5)

This invention relates to a method of operating a furnace for burning a low heat content fuel, particularly carbon monoxide, or CO gas, which is obtained in the catalytic regenerating process in the petroleum industry.

Today, the petroleum industry makes widespread use of catalysts in the production of gasoline. In this process, the catalyst moves through the oil zone to expedite the desired reactions. During this process, the catalyst picks up carbon, which must be removed before the catalyst can again be used. This is accomplished by passing the catalyst through a catalytic regenerator or converter, where air continuously burns the coke deposits from the catalyst.

Until very recently, the waste gases from the catalytic regenerating or converting process were allowed to escape into the atmosphere. This was undesirable for two main reasons. First, these waste gases contain CO and other hydrocarbons which pollute the atmosphere. Secondly, the waste gases leaving the regenerator are at extremely high temperatures, on the order of 1000–1200° F. and also contain some combustible matter. By allowing these hot gases to escape to the atmosphere, a great amount of energy was being wasted.

To overcome the above problems, a waste heat boiler was added in recent years to modern refineries to burn this waste gas from the regenerator, which gas is commonly referred to as CO gas although the percentage of carbon monoxide contained therein is usually only 5–10 percent of the total volume.

In burning this waste gas, or CO gas, many problems are encountered. One of the major problems is handling the extremely high temperature CO gas. Because of the high temperature, the valves, dampers, burner units, and ducts must be made of special construction and materials, so as to be able to withstand the high temperatures. As an example, the duct through which the high temperature CO gas travels to the furnace must be refractory lined. Also, reinforcing of the refractory with steel grating is necessary to prevent abrasion of the refractory by the catalyst which is carried over by the CO gas. In the lower portion of the seal tanks, where the walls thereof come in contact with the water used to form the liquid valve, it is necessary to provide an inner stainless steel lining. Furthermore, many slip joints in the ductwork must be provided for, to allow expansion and contraction thereof caused by the high temperature.

The volume of CO gas that is discharged from the regenerator is very large, usually running on the order of many hundreds of thousands of pounds per hour, and because of this, liquid valves are used in the duct to control or regulate flow. Because of the high temperature of the CO gas that comes into contact with the water contained in the liquid valves, a portion of it is flashed into steam or water vapor, which is carried along with the CO gas to the furnace. This added water vapor content of the CO gas tends to reduce the ultimate utilizable heat value of the already low heat content CO gas.

Another problem that is encountered in a CO fired furnace is maintaining ignition and proper combustion of the CO gas within the furnace. The CO gas exhausted by the regenerator is of very low heat value, being on the order of 15–20 B.t.u.'s per cubic foot. The CO gas contains a large amount of inert gases, which accounts for its low heat content. A typical CO gas contains over 65 percent nitrogen, almost 10 percent carbon dioxide, and close to 20 percent water vapor, all of which are incombustible. Nearly all of the remaining unaccounted for portion, 5–10 percent, is carbon monoxide, or CO, which is combustible. Because of the large amount of incombustible material and the slow rate of gas diffusion, proper mixing of the CO gas with the air necessary to support combustion within the furnace is difficult, and very large furnaces are necessary.

It is an object of this invention to help overcome many of the above mentioned problems. In accordance with this invention, the CO gas flowing to the furnace is premixed with an excess of air necessary for combustion which air is at atmospheric temperature. The resulting mixture will be at a much lower temperature than the CO gas, thus dispensing with the necessity of refractory lining of the ductwork, and hence also the reinforcing steel grating. There can also be a reduction in the number and complexity of the expansion joints. Since the temperature of the mixture is lower, there will be less evaporation of the water in the liquid valves, which will result in an increase in the utilizable heat content of the fuel. Also, with a more complete gas mixture prior to entrance into the furnace, with better contact of the combustibles within the CO gas with the oxygen contained in the air, combustion will be completed in a shorter time, and a smaller furnace can be used.

Additional objects and advantages of the invention will appear from the following description of a preferred embodiment thereof when considered in conjunction with the accompanying drawing wherein FIGURE 1 is a side view of a catalytic converter, and a CO fired furnace in which the exhaust gases from the converter are burned.

Referring now to the drawing, numeral 10 designates a catalytic regenerator or converter, where air continuously burns the coke deposits from the catalyst. The gases discharged from the regenerator are at extremely high temperatures, on the order of 1000–1200° F. These high temperature gases are discharged through duct 14 into restriction tower 12. The regenerating process must be carried on under superatmospheric conditions, and hence the restriction tower contains orifice plates to maintain this condition within the regenerator. The gases pass by way of duct 18 into liquid valve or seal drum 16. This drum is equipped with inlet 20 by means of which water can be supplied thereto. Also a suitable outlet, not shown, would be provided by means of which the drum 16 can be drained. When it is desired to close off the flow passage, water is admitted to the drum 16 through inlet 20 until the level thereof rises above the bottom 28 of the centrally located pipe or duct 18, thereby sealing it off.

Just prior to entrance of the hot exhaust gases, or CO gas into drum 16, air at atmospheric temperature, in excess of that required for combustion of the CO gas, is introduced into the duct 18 by way of nozzle 22. This air is supplied by forced draft fan 24 by way of duct 26. The mixture of CO gas and air is then introduced into furance 30 by way of duct 32 and branch ducts 34 and 36. The mixture is introduced into tangential, or corner mounted burner units 38, which direct the masses of fuel, air, and flames towards the outer periphery of an imaginary circle in the center of the furnace. This type of introduction results in a more thorough mixing of the fuel, air, and flames, which results in a more complete and efficient burning of the fuel.

Since the B.t.u. value of the CO gas is very low, being approximately 15–20 B.t.u.'s per cubic foot, supplemental fuel is added to the furnace through oil burners or guns 40, which are also mounted in the four corners of the furnace. This supplemental fuel is necessary to maintain ignition of the low heat content CO gas, and also supplies additional heat necessary to obtain the desired amount of steam from the boiler. Duct 42, which branches off main air duct 26, supplies a portion of the air necessary for combustion of the oil. The remaining portion is furnished by the excess air admitted along with the CO gas. The hot gases within the furnace 30 rise and pass over the superheater structure 44 and the vapor generating tubes 46, which absorb heat from the hot gases. The vapor generating tubes 46 extend between upper steam and water drum 41 and low mud drum 43. Downcomers 45 lead from mud drum 43 to lower headers located near the bottom of the furnace. Tubes 47 connect the lower headers to the water wall tubes which line the inner walls of the furnace.

In the event that the furnace 30 is not in operation, or for some other reason it is desired not to burn the CO gases being exhausted from regenerator 10, bypass drum 48 is provided. This drum is connected to duct 18 by means of duct 49. It is provided with a water inlet 50 and a suitable drain, not shown, similar to the construction of seal drum 16. Duct 52 connects the bypass drum 48 to a stack 54, by means of which the gases can be exhausted to the atmosphere. The duct 52 is provided with a damper 56. When both liquid valves are empty, for example in starting up of the unit, the damper 56 can be used to close off the duct 52, thus preventing the CO gases from escaping through stack 54, and will allow such gas to flow to the furnace 30 to be burned.

An example of the quantities of CO gas and excess air to be premixed therewith in a typical CO fired furnace is as follows: CO gas flows from the regenerator at a rate of 404,000 lbs. per hour at a temperature of 1150° F. The theoretical air necessary for combustion of this gas is .12 lb. per lb. of fuel, or CO gas. This means that approximately 48,000 lbs. per hour of air would have to be supplied for the combustion of 404,000 lbs. per hour of CO gas. In accordance with the present invention, an excess of 200 percent air is introduced into the CO gas prior to entrance into the furnace. The amount of air actually mixed with the CO gas is thus 145,000 lbs. per hour. This air is at atmospheric temperature, or approximately 80° F. The resulting temperature of the mixture will thus be ±880°, which is considerably lower than the original temperature of the CO gas.

In summarizing, the premixing of the CO gas with an excess of air necessary for combustion results in a saving of original construction and maintenance costs, allows the use of a smaller furnace, and enhances more efficient and complete combustion of the CO gas in the furnace. While the preferred embodiment of the invention has been shown and described, it will be understood that such is merely illustrative and not restrictive. For example, the air introduced into the CO gas can be at temperatures other than atmospheric, so long as it is at a temperature which is considerably lower than the temperature of the CO gas. Also, the ratio of the air to the CO gas can be varied, depending on the desired temperature of the resulting mixture, and the B.t.u. content of the CO gas.

What we claim is:

In apparatus for burning a high temperature, low heat content fuel including a furnace, a passageway for conveying the low heat content fuel from a source to the furnace, inlet means through which the low heat content fuel is introduced into the furnace along with air in a turbulent manner, a liquid valve positioned in the passageway a substantial distance from the furnace, and nozzle means connected to the passageway upstream of the liquid valve, the method of operation comprising the steps of conveying a stream of low heat content fuel through the passageway to the furnace, introducing into the stream of low heat content fuel through the nozzle means air at ambient temperature, the amount of air introduced into the stream of low heat content fuel being 200 percent in excess of that required to burn the low heat content fuel, and introducing the mixture of low heat content fuel and air into the furnace through the inlet means, thus resulting in a substantial reduction in temperature of the low heat content fuel, and an intimate mixing of the low heat content fuel with the air that is introduced into the furnace, and introducing supplementary high heat content fuel and additional air into the furnace so as to maintain proper ignition and combustion of the low heat content fuel.

References Cited in the file of this patent

UNITED STATES PATENTS

| | | |
|---|---|---|
| 1,465,475 | Hope | Aug. 21, 1923 |
| 2,143,820 | Payn | Jan. 10, 1939 |
| 2,216,117 | Krug | Oct. 1, 1940 |
| 2,688,360 | Haynes et al. | Sept. 7, 1954 |
| 2,777,428 | Campbell et al. | Jan. 15, 1957 |
| 2,840,049 | Durham | June 24, 1958 |
| 3,009,513 | Houdry | Nov. 21, 1961 |
| 3,049,300 | Lewis et al. | Aug. 14, 1962 |

OTHER REFERENCES

Steam, Its Generation and Use, 37th Ed., George McKibbin and Son, New York, copyright 1955, page 19-2.